(12) United States Patent
Nagasaka et al.

(10) Patent No.: US 10,433,221 B2
(45) Date of Patent: Oct. 1, 2019

(54) BASE STATION AND RADIO TERMINAL

(71) Applicant: KYOCERA CORPORATION, Kyoto (JP)

(72) Inventors: Yushi Nagasaka, Ritto (JP); Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/748,123

(22) PCT Filed: Jul. 29, 2016

(86) PCT No.: PCT/JP2016/072438
§ 371 (c)(1),
(2) Date: Jan. 26, 2018

(87) PCT Pub. No.: WO2017/018539
PCT Pub. Date: Feb. 2, 2017

(65) Prior Publication Data
US 2018/0227812 A1    Aug. 9, 2018

Related U.S. Application Data

(60) Provisional application No. 62/198,953, filed on Jul. 30, 2015.

(51) Int. Cl.
*H04W 36/00* (2009.01)
*H04W 24/10* (2009.01)
(Continued)

(52) U.S. Cl.
CPC ....... *H04W 36/0088* (2013.01); *H04W 24/10* (2013.01); *H04W 36/14* (2013.01);
(Continued)

(58) Field of Classification Search
CPC . H04W 24/10; H04W 36/0088; H04W 36/14; H04W 48/18; H04W 76/27; H04W 84/12; H04W 88/06
See application file for complete search history.

(56) References Cited

U.S. PATENT DOCUMENTS

2013/0242783 A1* 9/2013 Horn ............... H04W 24/10
370/252
2014/0010223 A1   1/2014 Wang et al.
(Continued)

FOREIGN PATENT DOCUMENTS

| JP | 2015-057883 A | 3/2015 |
|----|---------------|--------|
| JP | 2015-517241 A | 6/2015 |
| WO | 2014/112599 A1 | 7/2014 |

OTHER PUBLICATIONS

International Search Report issued in PCT/JP2016/072438; dated Oct. 18, 2016.
(Continued)

*Primary Examiner* — Kashif Siddiqui
(74) *Attorney, Agent, or Firm* — Studebaker & Brackett PC

(57) ABSTRACT

A base station according to one embodiment is configured to perform communication with a radio terminal and a wireless wide area network (WWAN) system. The base station comprises a controller configured to transmit first configuration information with which the radio terminal configures a measurement report in the radio terminal. The measurement report is a report of a measurement result about a signal transmitted by a wireless local area network (WLAN) system from an access point. The first configuration information includes a predetermined identifier associated with a group of access points to be measured by the radio terminal. The predetermined identifier is associated with an identifier of each of the access points in the group. The group is a group
(Continued)

in which the radio terminal is capable of steering among access points without being dependent on a command from the base station.

7 Claims, 12 Drawing Sheets

(51) Int. Cl.
*H04W 36/14* (2009.01)
*H04W 48/18* (2009.01)
*H04W 88/06* (2009.01)
*H04W 76/27* (2018.01)
*H04W 84/12* (2009.01)

(52) U.S. Cl.
CPC ........... *H04W 48/18* (2013.01); *H04W 76/27* (2018.02); *H04W 88/06* (2013.01); *H04W 84/12* (2013.01)

(56) References Cited

U.S. PATENT DOCUMENTS

| | | | |
|---|---|---|---|
| 2014/0029570 A1* | 1/2014 | Lee | H04W 36/0005 370/331 |
| 2015/0078153 A1* | 3/2015 | Kuo | H04W 76/27 370/230 |
| 2015/0358884 A1 | 12/2015 | Nagasaka et al. | |
| 2018/0213546 A1* | 7/2018 | Zhao | H04W 28/08 |
| 2018/0270742 A1* | 9/2018 | Bergstrom | H04W 40/244 |

OTHER PUBLICATIONS

Intel Corporation et al.; "Agreements on LTE-WLAN Radio Level Integration and Interworking Enhancement"; 3GPP TSG-RAN2 Meeting 89-bis; R2-152922; Apr. 20-24, 2015; pp. 1-6; Bratislava, Slovakia.

Kyocera; "Consideration on WLAN Measurement"; 3GPP TSG-RAN WG2 #91; R2-153414; Aug. 24-28, 2015; pp. 1-5; Beijing, China.

* cited by examiner

FIG. 7

```
MeasConfig ::=                      SEQUENCE {
   -- Measurement objects
   measObjectToRemoveList      MeasObjectToRemoveList           OPTIONAL,     -- Need ON
   measObjectToAddModList      MeasObjectToAddModList           OPTIONAL,     -- Need ON
```
...
```
MeasObjectToAddModList ::=          SEQUENCE (SIZE (1..maxObjectId)) OF MeasObjectToAddMod
```
...
```
MeasObjectToAddMod ::=   SEQUENCE {
    measObjectId                    MeasObjectId,
    measObject                      CHOICE {
        measObjectEUTRA                 MeasObjectEUTRA,
        measObjectUTRA                  MeasObjectUTRA,
        measObjectGERAN                 MeasObjectGERAN,
        measObjectCDMA2000              MeasObjectCDMA2000,
        measObjectWLAN                  MeasObjectWLAN,
        ...
    }
}
```
...
```
MeasObjectWLAN ::=             SEQUENCE {
   wlancarrierFreq          ENUMERATED {GHz2.4, GHz5.0},              -- Need ON
   wlansToRemoveList        WlanIndexList            OPTIONAL,        -- Need ON
   wlansToAddModList        WlansToAddModList        OPTIONAL,        -- Need ON
   WlansToAddModList ::=    SEQUENCE (SIZE (1.. maxWLAN-Id-r13)) OF WlansToAddMod
   WlansToAddMod ::=   SEQUENCE {
      wlanIndex                         INTEGER (1.. maxWLAN-Id-r13),
      wlan-Identifiers-r13              Wlan-Identifiers-r13
   }
}
```

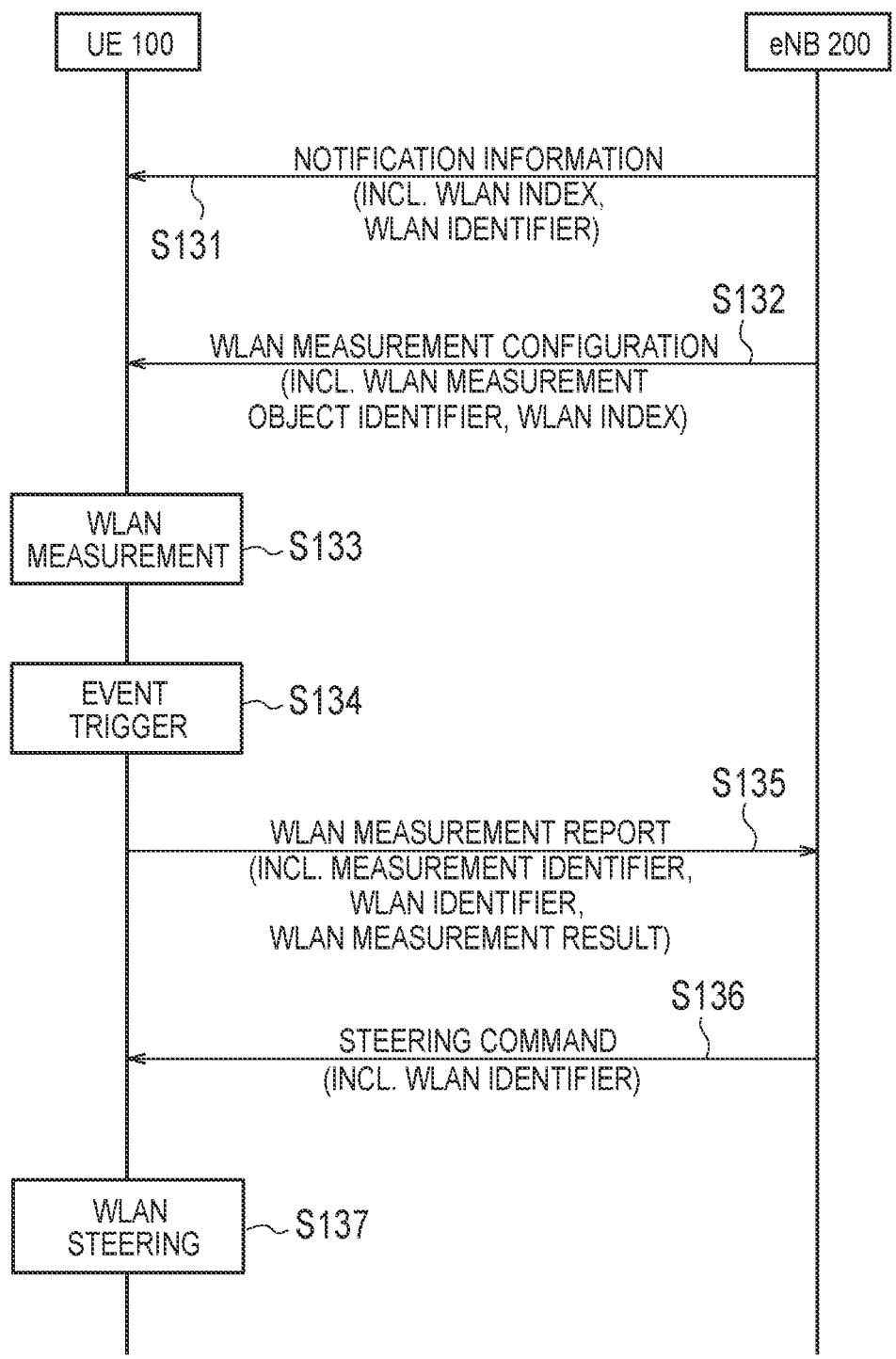

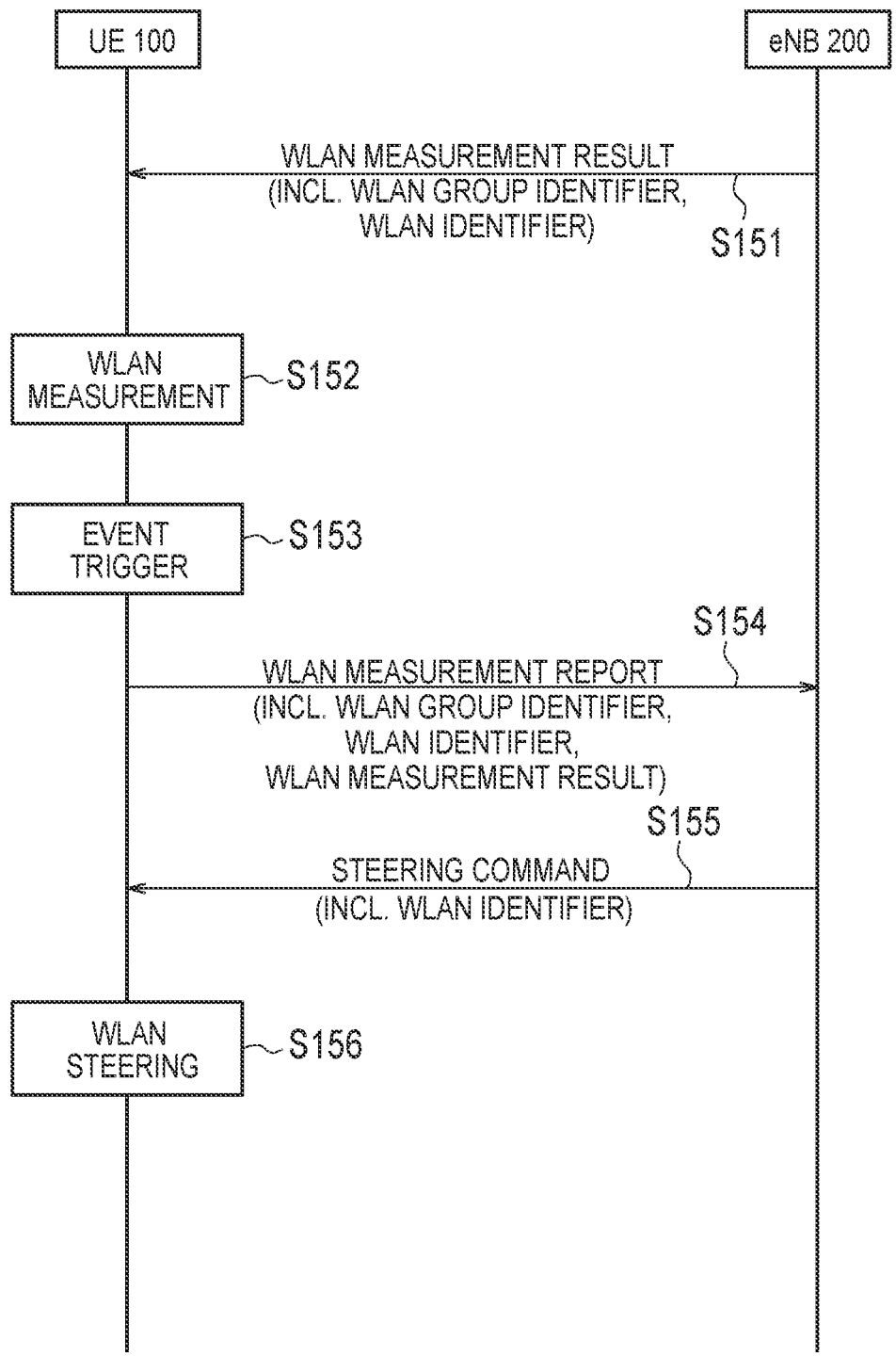

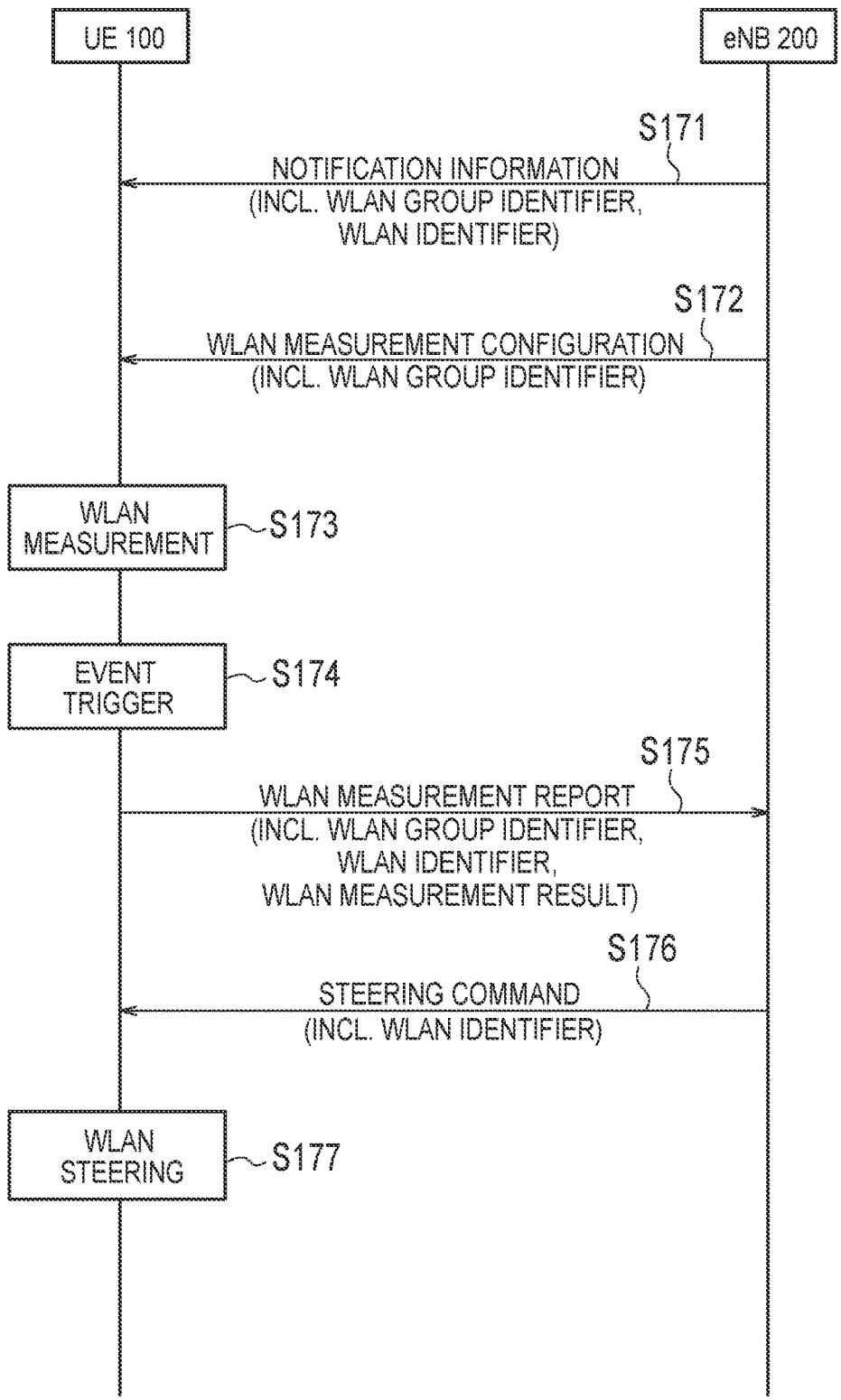

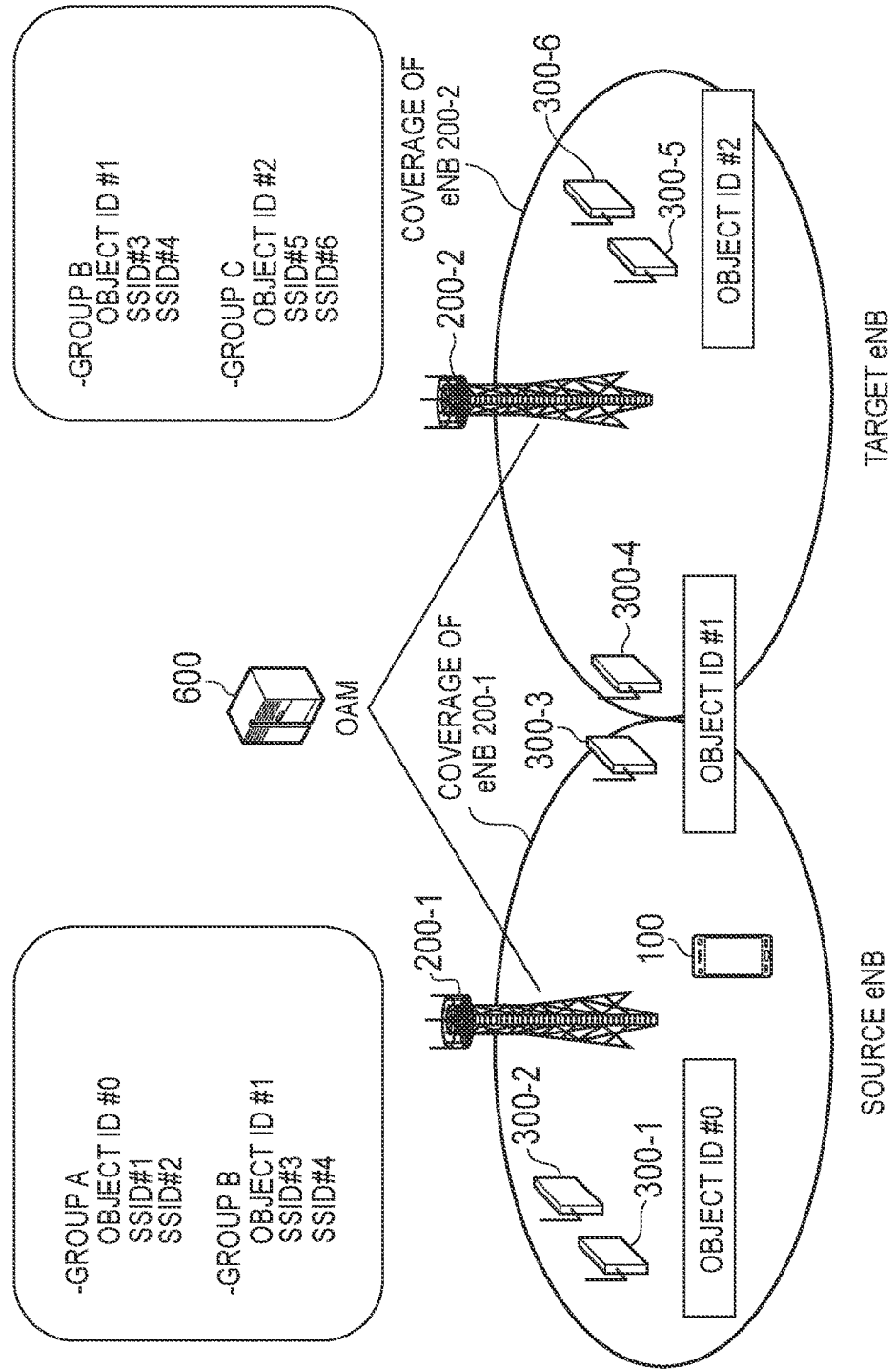

BASE STATION AND RADIO TERMINAL

TECHNICAL FIELD

The present invention relates to a base station and a radio terminal in a system in which a WLAN cooperate with a WWAN.

BACKGROUND ART

Recently, radio terminals that can be used in both communication by wireless wide area network (WWAN) system (e.g. LTE) and communication by wireless local area network (WLAN) system are being widely used. In order to provide high speed and large capacity communication service to such radio terminals, a technology to enhance cooperation between the WWAN and the WLAN is being studied.

SUMMARY OF THE INVENTION

A base station according to one embodiment is configured to perform communication with a radio terminal and a wireless wide area network (WWAN) system. The base station comprises a controller configured to transmit first configuration information with which the radio terminal configures a measurement report in the radio terminal. The measurement report is a report of a measurement result about a signal transmitted by a wireless local area network (WLAN) system from an access point. The first configuration information includes a predetermined identifier associated with a group of access points to be measured by the radio terminal. The predetermined identifier is associated with an identifier of each of the access points in the group. The group is a group in which the radio terminal is capable of steering among access points without being dependent on a command from the base station.

BRIEF DESCRIPTION OF THE DRAWINGS

FIG. 7 is a diagram illustrating a detailed example of the WLAN measurement configuration in the operation pattern 1A according to the first embodiment.

FIG. 8 is a sequence diagram illustrating an operation pattern 1B according to the first embodiment.

FIG. 9 is a sequence diagram illustrating an operation pattern 2A according to the first embodiment.

FIG. 10 is a sequence diagram illustrating an operation pattern 2B according to the first embodiment.

FIG. 11 is a diagram illustrating intra-eNB handover control according to the first embodiment.

DESCRIPTION OF THE EMBODIMENT

Overview of the Embodiments

Figure 1:
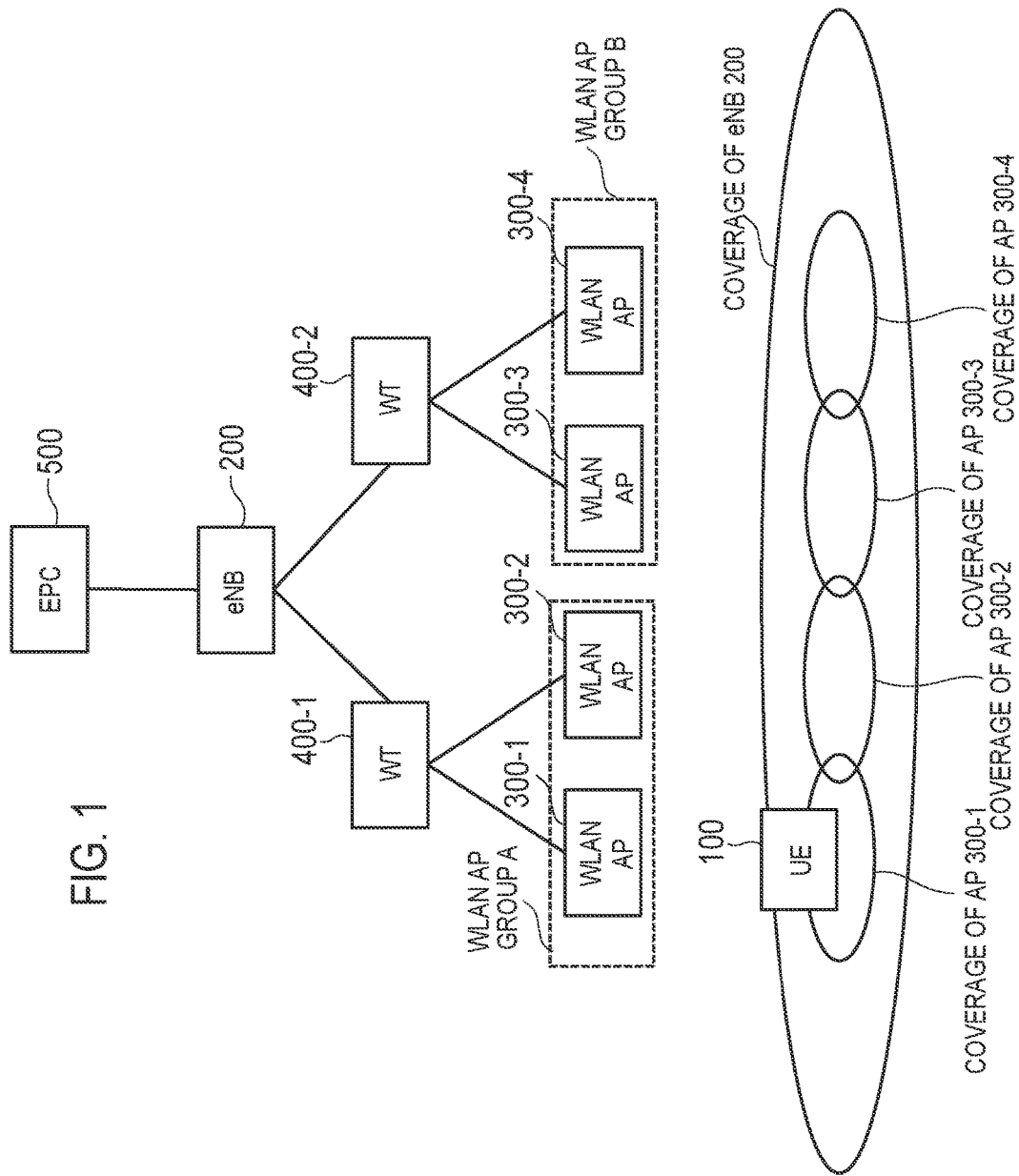
FIG. 1 is a diagram illustrating a configuration of a communication system according to a first embodiment and a second embodiment.

A WWAN base station according to the embodiments is configured to perform WWAN communication with a radio terminal. The WWAN base station comprises a controller configured to transmit WLAN measurement configuration configuring WLAN measurement report. The WLAN measurement configuration includes a predetermined identifier associated with a WLAN access point group of measurement object. The predetermined identifier is associated with an identifier of each of WLAN access points in the WLAN access point group of measurement object. The WLAN access point group is a group in which the radio terminal is capable of steering among WLAN access points without being dependent on a command from the base station.

In the embodiments, the predetermined identifier is an identifier of a measurement object configuration which configures a measurement object.

In the embodiments, the WLAN measurement configuration includes an index of each of the WLAN access points in the WLAN access point group of measurement object. The index has a shorter bit length than that of the identifier of each of the WLAN access points.

In the embodiments, the WLAN measurement configuration further includes an identifier of each of the WLAN access points in the WLAN access point group of measurement object.

In the embodiments, the controller further configured to transmit notification information different from the WLAN measurement configuration to the radio terminal by broadcast or unicast. The notification information includes each index and each identifier of a plurality of WLAN access points.

In the embodiments, the predetermined identifier is a group identifier of the WLAN access point group of measurement object.

In the embodiments, the WLAN measurement configuration further includes an identifier of each of the WLAN access points in the WLAN access point group of measurement object.

In the embodiments, the controller further configured to transmit notification information different from the WLAN measurement configuration to the radio terminal by broadcast or unicast. The notification information includes a group identifier of a WLAN access point group, and an identifier of each of the access points in the group identifier of a WLAN access point group.

A radio terminal according to the embodiments performs WWAN communication with a WWAN base station. The radio terminal comprises a controller configured to receive, from the WWAN base station, WLAN measurement configuration configuring WLAN measurement report. The WLAN measurement configuration includes a predetermined identifier associated with a WLAN access point group of measurement object. The predetermined identifier is associated with an identifier of each of WLAN access points in the WLAN access point group of measurement object. The WLAN access point group is a group in which the radio terminal is capable of steering among WLAN access points without being dependent on a command from the base station.

In the embodiments, the predetermined identifier is an identifier of a measurement object configuration which configures a measurement object.

In the embodiments, the WLAN measurement configuration includes an index of each of the WLAN access points in the WLAN access point group of measurement object. The index has a shorter bit length than that of the identifier of each of the WLAN access points.

In the embodiments, the WLAN measurement configuration further includes an identifier of each of the WLAN access points in the WLAN access point group of measurement object.

In the embodiment, the controller configured to receive notification information different from the WLAN measurement configuration from the base station or a core network. The notification information includes each index and each identifier of a plurality of access points.

In the embodiments, the predetermined identifier is a group identifier of the WLAN access point group of measurement object.

In the embodiments, the WLAN measurement configuration further includes an identifier of each of the WLAN access points in the WLAN access point group of measurement object.

In the embodiment, the controller configured to receive notification information different from the WLAN measurement configuration from the base station or a core network. The notification information includes a group identifier of a WLAN access point group, and an identifier of each of the access points in the group identifier of a WLAN access point group.

A radio terminal according to the embodiments is configured to perform WWAN communication with a WWAN base station. The radio terminal comprises a controller configured to receive WLAN measurement configuration configuring a WLAN measurement report, from the WWAN base station, in an RRC (Radio Resource Control) connected mode. If the controller transitions from the RRC connected mode to an RRC idle mode, the controller holds the WLAN measurement configuration in the RRC idle mode.

In the embodiments, the controller is configured to, when steering to a WLAN access point is performed in response to a steering command from the WWAN base station, transition from the RRC connected mode to the RRC idle mode and hold the WLAN measurement configuration in the RRC idle mode.

In the embodiments, the WLAN measurement configuration is included in the steering command.

In the embodiments, the controller is configured to hold the WLAN measurement configuration in the RRC idle mode as long as the controller is receiving, from the WWAN base station, configuration information indicating that the WLAN measurement configuration information should be held.

In the embodiments, the controller is configured to receive, from the WWAN base station, period information indicating a period in which the controller need to hold the WLAN measurement configuration information. The controller is configured to hold the WLAN measurement configuration information over the period indicated by the period information after the controller transitioned from the RRC connected mode to the RRC idle mode.

In the embodiments, the WLAN measurement configuration information includes a predetermined identifier associated with an access point group of measurement object. The controller is configured to perform measurement on the access point group of measurement object in the RRC idle mode based on the WLAN measurement configuration information.

In the embodiments, in the RRC idle mode, the controller is configured to transition from the RRC idle mode to the RRC connected mode based on a discover or a measurement result of the access point group of measurement object.

In the embodiments, the controller is configured to transition from the RRC idle mode to the RRC connected mode based on the discover or the measurement result of the access point group of measurement object or as long as the controller is receiving, from the WWAN base station, configuration information indicating that the controller need to transition to the RRC connected mode.

First Embodiment

The first embodiment will be described below.

In the first embodiment, an example in which the WWAN system is an LTE (Long Term Evolution) system will be described. The LTE system is a system whose specifications are formulated in 3GPP (3rd Generation Partnership Project) which is a standardization project.

(System Configuration)

FIG. 1 is a diagram illustrating a configuration of a communication system according to the first embodiment.

As illustrated in FIG. 1, a communication system according to an embodiment includes UE (user equipment) 100, an eNB (evolved Node-B) 200, a WLAN access point (WLAN AP) 300, a WT (WLAN termination) 400, and an EPC (evolved packet core) 500. The UE 100 corresponds to a radio terminal. The eNB 200 corresponds to a WWAN base station. The eNB 200 and the EPC 500 constitute a WWAN (an LTE network). The WLAN AP 300 and WT 400 constitute a WLAN. The communication system does not necessarily have to include the WT 400.

The UE 100 is a mobile apparatus that can be used in both the WWAN communication (LTE communication) system and the WLAN communication system. The UE 100 supports a WWAN-WLAN cooperation technology. A configuration of the UE 100 will be described later.

The eNB 200 is an apparatus which manages one or a plurality of cells and performs LTE communication with the UE 100 connected to its own managing cell. A configuration of the UE 100 will be described later.

The eNB 200 constitutes an E-UTRAN (Evolved-UMTS Terrestrial Radio Access Network). The eNB 200 is connected to a neighboring eNB via an X2 interface. The eNB 200 has a radio resource management (RRM) function, a routing function of user data (hereinafter, simply referred to as "data"), and a measurement control function for mobility control and scheduling, and so forth. A configuration of the eNB 200 will be described later. The term "cell" refers to the minimum unit of a radio communication area (a coverage) and also refers to a function to perform radio communication with the UE 100.

The WLAN AP 300 is an apparatus which performs WLAN communication with the UE 100 connected to the own AP. FIG. 1 illustrates an example in which four WLAN APs 300 (WLAN APs 300-1 to 300-4) are provided in a cell coverage of the eNB 200. The eNB 200 may also have a function of the WLAN AP. Such a scenario is referred to as a Collocated scenario.

The WT 400 is an apparatus which terminates an Xw interface which is a direct interface with the eNB 200. The WT 400 accommodates a plurality of WLAN APs 300. FIG. 1 illustrates an example in which a WT 400-1 accommodates two WLAN APs 300-1 and 300-2, and a WT 400-2 accommodates two WLAN APs 300-3 and 300-4.

In an embodiment, the WLAN APs 300-1 and 300-2 constitute a WLAN AP group A. The WLAN APs 300-3 and 300-4 constitute a WLAN AP group B. FIG. 1 illustrates an example in which a WLAN AP group is constituted by the WLAN APs 300 accommodated in the same WT 400. However, a WLAN AP group may be constituted by WLAN APs 300 accommodated in different WTs 400.

Here, the WLAN AP group is a group in which the UE 100 can autonomously perform steering control among the WLAN APs 300 without depending on commands by the eNB 200. The UE 100 can steer the WLAN communication from one WLAN AP to another WLAN AP in the same WLAN AP group by using a WLAN mobility control function with our instruction from the eNB 200. The eNB 200 controls steering among different WLAN AP groups.

The EPC 500 is connected to the eNB 200 via an S1 interface. The EPC 500 corresponds to a core network. The EPC 500 includes MME (Mobility Management Entity) and an S-GW (Serving-Gateway). The MME performs various types of mobility control and so forth with respect to the UE 100. The S-GW performs data transfer control.

(LTE Protocol)

Figure 2:
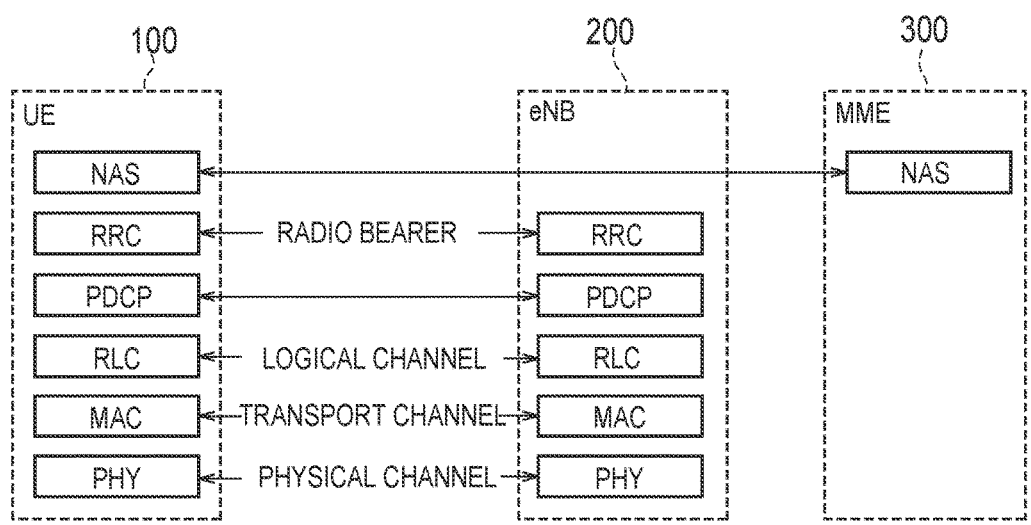
FIG. 2 is a protocol stack diagram of a radio interface in an LTE system.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted through the physical channel.

The MAC layer performs preferential control of data, retransmission process by hybrid ARQ (HARQ), random access procedure and the like. Between the MAC layer of the UE 100 and the MAC layer of the eNB 200, data and control signal are transmitted through a transport channel. The MAC layer of the eNB 200 includes a transport format of an uplink and a downlink (a transport block size, a modulation and coding scheme (MCS), and the like) and a scheduler for determining a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted through a logical channel.

The PDCP layer performs header compression and extension, and encryption and decryption.

The RRC layer is defined only in a control plane which handles control signals. Between the RRC layer of the UE 100 and the RRC layer of the eNB 200, messages (RRC messages) for various types of setting are transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a RRC connected mode (connected mode), otherwise, the UE 100 is in an RRC idle mode (idle mode).

A NAS (Non-Access Stratum) layer positioned above the RRC layer performs session management or mobility management, for example.

(Configuration of Radio Terminal)

Figure 3:
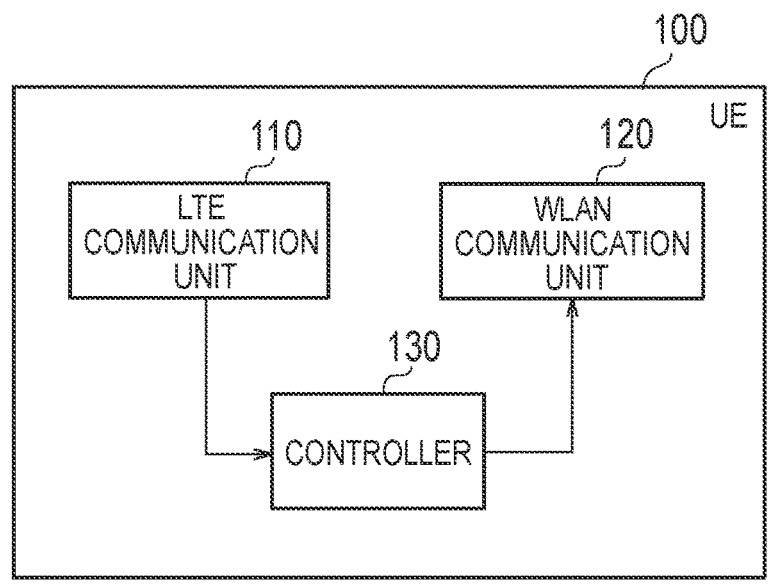
FIG. 3 is a block diagram of UE (a radio terminal).

FIG. 3 is a block diagram of the UE 100 (the radio terminal). As illustrated in FIG. 3, the UE 100 includes an LTE communication unit (a WWAN communication unit) 110, a WLAN communication unit 120, and a controller 130.

The LTE communication unit 110 performs LTE communication under the control of the controller 130. The LTE communication unit 110 may perform a part of an LTE protocol. The LTE communication unit 110 includes an antenna, a transmitter, and a receiver. The transmitter transforms a baseband signal (a transmission signal) output from the controller 130 into an LTE radio signal and transmits the LTE radio signal from the antenna. The receiver transforms the LTE radio signal received by the antenna into a baseband signal (a received signal) and outputs the baseband signal to the controller 130. The LTE communication is generally performed in a licensed band.

The WLAN communication unit 120 performs the WLAN communication under the control of the controller 130. The WLAN communication unit 120 may perform a part of a WLAN protocol. The WLAN communication unit 120 includes an antenna, a transmitter, and a receiver. The transmitter transforms a baseband signal (a transmission signal) output from the controller 130 into an LTE radio signal and transmits the LTE radio signal from the antenna. The receiver transforms the WLAN radio signal received by the antenna into a baseband signal (a received signal) and outputs the baseband signal to the controller 130. The WLAN communication is generally performed in an unlicensed band.

The controller 130 performs various types of control in the UE 100. The controller 130 may perform a part of the LTE protocol or a part of the WLAN protocol. The controller 130 includes a processor and memory. The memory stores a program to be executed by the processor and information to be used for the processing by the processor. The processor may include a baseband processor which performs, for example, modulation/demodulation and encoding/decoding of the baseband signal, and a CPU (Central Processing Unit) that executes the program stored in the memory to perform various types of processing. The processor performs various types of processing described later.

(Configuration of Base Station)

Figure 4:
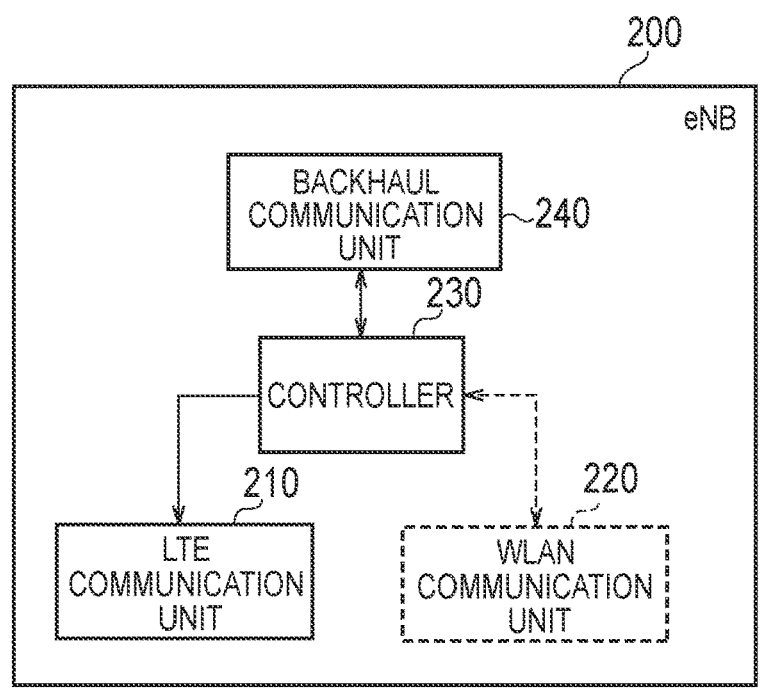
FIG. 4 is a block diagram of an eNB (a base station).

FIG. 4 is a block diagram of the eNB 200 (the base station). As illustrated in FIG. 4, the eNB 200 includes an LTE communication unit (a WWAN communication unit) 210, a controller 230, and a backhaul communication unit 240. In the case of the Collocated scenario, the eNB 200 may include a WLAN communication unit 220.

The LTE communication unit 210 performs LTE communication under the control of the controller 230. The LTE communication unit 210 may perform a part of the LTE protocol. The LTE communication unit 210 includes an antenna, a transmitter, and a receiver. The transmitter transforms a baseband signal (a transmission signal) output from the controller 230 into an LTE radio signal and transmits the LTE radio signal from the antenna. The receiver transforms the LTE radio signal received by the antenna into a baseband signal (a received signal) and outputs the baseband signal to the controller 230.

The WLAN communication unit 220 performs the WLAN communication under the control of the controller 230. The WLAN communication unit 220 may perform a part of the WLAN protocol. The WLAN communication unit 220 includes an antenna, a transmitter, and a receiver. The transmitter transforms a baseband signal (a transmission signal) output from the controller 230 into an LTE radio signal and transmits the LTE radio signal from the antenna. The receiver transforms the WLAN radio signal received by the antenna into a baseband signal (a received signal) and outputs the baseband signal to the controller 230.

The controller 230 performs various types of control in the eNB 200. The controller 230 may perform a part of the LTE protocol or a part of the WLAN protocol. The controller 230 includes a processor and memory. The memory stores a program to be executed by the processor and information to be used for the processing by the processor. The processor may include a baseband processor which performs, for example, modulation/demodulation and encoding/decoding of the baseband signal, and a CPU (Central Processing Unit) that executes the program stored in the memory to perform various types of processing. The processor performs various types of processing described later.

The backhaul communication unit 240 is connected to the neighboring eNB 200 via the X2 interface, connected to the EPC 500 (MME/S-GW) via the S1 interface, and connected to the WT 400 via the Xw interface. The backhaul communication unit 240 is used for the communication to be performed on the X2 interface, the communication to be performed on the S1 interface, the communication to be performed on the Xw interface, and so forth.

(Steering Control Among WLAN AP Groups)

As described above, if the UE 100 performs WLAN AP steering among different WLAN AP groups, the eNB 200 performs WLAN AP steering control. In this case, it is possible to extend a mechanism of a measurement report in the LTE for the WLAN.

A technology to enable the eNB 200 to properly perform WLAN AP steering control (WLAN mobility control) among different WLAN AP groups in the first embodiment will be described.

The eNB 200 according to the first embodiment transmits a WLAN measurement configuration (WLAN measurement configuration information) for configuring a WLAN measurement report to the UE 100. For example, the eNB 200 includes the WLAN measurement configuration in an "RRC Connection Reconfiguration" message which is a dedicated RRC signaling addressed to the UE 100. The UE 100 receives the WLAN measurement configuration from the eNB 200. The WLAN measurement configuration includes a predetermined identifier associated with a WLAN AP group of a measurement object. The predetermined identifier is associated with an identifier of each WLAN AP 300 in the WLAN AP group of the measurement object.

By including such a predetermined identifier in the WLAN measurement configuration, the UE 100 can discover and measure the WLAN AP 300 belonging to the WLAN AP group of the measurement object, and can transmit the WLAN measurement report to the eNB 200. Therefore, the eNB 200 can know that the UE 100 has moved to the coverage of the WLAN AP group of the measurement object, and can properly perform WLAN mobility control with respect to the WLAN AP group.

(1) Operation Pattern 1

In an operation pattern 1 of an embodiment, the predetermined identifier is an identifier of a measurement object configuration which configures a measurement object. An identifier of such a measurement object configuration is referred to as a measurement object identifier (measObjectId).

In the operation pattern 1 of an embodiment, the WLAN measurement configuration includes an index of each WLAN AP 300 in the WLAN AP group of the measurement object. The index has a shorter bit length than that of the identifier of the WLAN AP 300. The identifier of the WLAN AP 300 is, for example, an SSID (Service Set Identifier), an HESSID (Homogeneous Extended Service Set Identifier), or a BSSID (Basic Service Set Identifier).

Signaling overhead can be reduced by introducing an index shorter than the identifier besides the identifier of the WLAN AP 300, and transmitting and receiving the index. For example, when removing some of the WLAN APs 300 from the measurement object, the removal can be instructed by using the index.

(1.1) Operation Pattern 1A

In the operation pattern 1A of an embodiment, the WLAN measurement configuration further includes an identifier of each WLAN AP 300 in the WLAN AP group of the measurement object.

Figure 5:
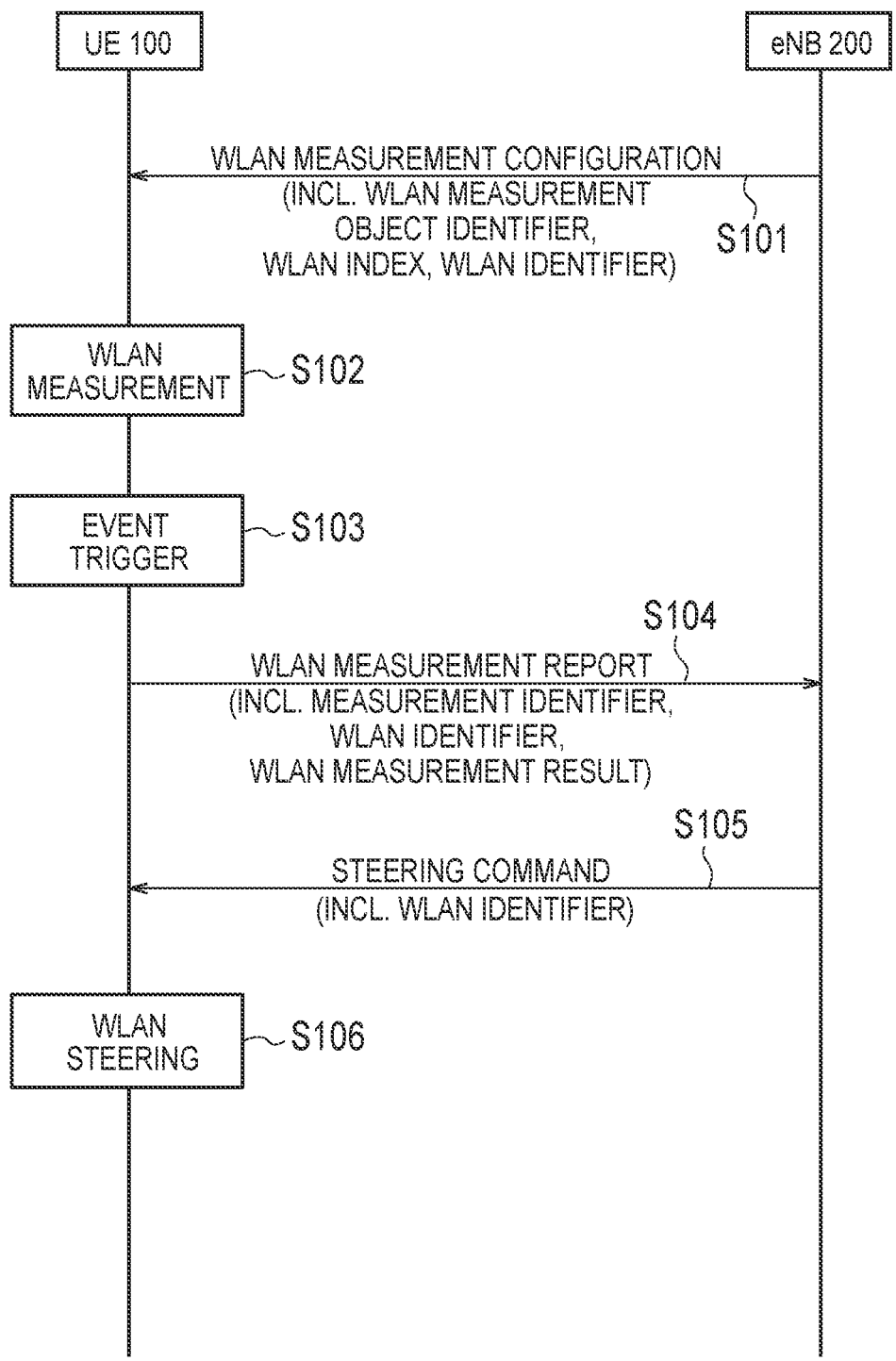
FIG. 5 is a sequence diagram illustrating an operation pattern 1A according to the first embodiment.
Figure 6:
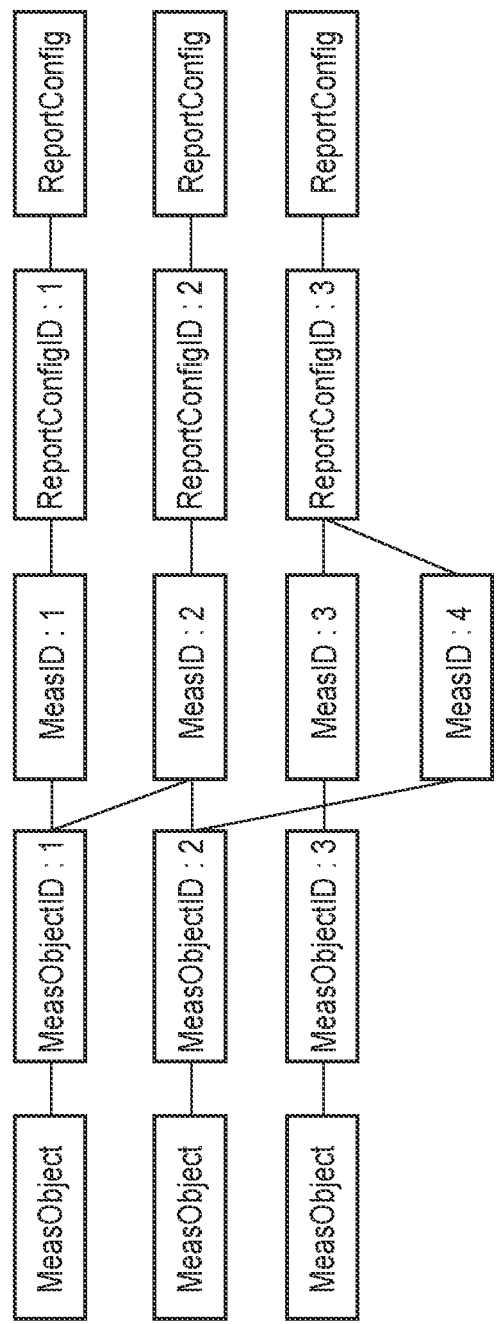
FIG. 6 is a diagram illustrating a configuration of a WLAN measurement configuration.

FIG. 5 is a sequence diagram illustrating the operation pattern 1A according to the first embodiment. FIG. 6 is a diagram illustrating a configuration of the WLAN measurement configuration. FIG. 7 is a diagram illustrating a detailed example of the WLAN measurement configuration in the operation pattern 1A according to the first embodiment. "Need ON" in FIG. 7 indicates that a parameter is optional, and if no value corresponding to that parameter exists, the UE 100 continues using the currently configured value.

As illustrated in FIG. 5, in step S101, the eNB 200 transmits the WLAN measurement configuration to the UE 100. The UE 100 receives the WLAN measurement configuration.

As illustrated in FIG. 6, the WLAN measurement configuration (MeasConfig) includes a measurement object (MeasObject), a report configuration (ReportConfig), and a measurement identifier (MeasID). The measurement identifier (MeasID) associates the measurement object (MeasObject) with the report configuration (ReportConfig). In particular, the measurement identifier (MeasID) indicates a combination of an identifier (MeasObjectID) of a measurement object (MeasObject) configuration and an identifier (ReportConfigID) of a report configuration (ReportConfig), and identifies a combination of a measurement object to be measured by the UE 100 and a report configuration.

As illustrated in FIG. 6, the measurement object (MeasObject) included in the WLAN measurement configuration (MeasConfig) includes a list of measurement objects to remove (MeasObjectToRemoveList), and a list of a measurement objects to add and modify (MeasObjectToAddModList).

Each measurement object included in the list (MeasObjectToAddModList) of measurement objects to add and modify (MeasObjectToAddMod) includes a measurement object identifier (measObjectId) and a measurement object (measObject). The measurement object (measObject) includes a measurement object WLAN (MeasObjectWLAN).

The measurement object WLAN (MeasObjectWLAN) includes a measurement object WLAN frequency (wlancarrierFreq), a list of WLAN APs to remove from the measurement objects (wlansToRemoveList), and a list of WLAN APs to add to the measurement object and modify (wlansToAddModList). FIG. 7 illustrates an example in which the measurement object WLAN frequency (wlancarrierFreq) is 2.4 GHz or 5 GHz. The list of WLAN APs to remove from the measurement object (wlansToRemoveList) includes a list of indices of the WLAN APs (wlanIndexList).

Each WLAN AP information (WlansToAddMod) included in the list of the WLAN AP to add to the measurement object and modify (wlansToAddModList) includes an index of each WLAN AP (wlanIndex) and an identifier (wlan-Identifiers-r13).

The report configuration (ReportConfig) included in the WLAN measurement configuration (MeasConfig) includes a trigger type (TriggerType) of the WLAN measurement report, and so forth. In the first embodiment, "event trigger reporting" in which a WLAN measurement report is to be transmitted when an event occurs will be mainly assumed. Examples of such events include an event that quality of the WLAN has become higher than a threshold, and an event that quality of the WLAN has become lower than a threshold. Examples may also include an event that quality of the LTE has become lower than a threshold by 1, and quality of the WLAN has become higher than a threshold by 2. Examples may also include an event that quality of the LTE has become higher than a threshold by 1, and quality of the WLAN has become lower than a threshold by 2. Examples may also include an event that quality of the current WLAN has become lower than a threshold by 1, and quality of other WLAN has become higher than a threshold by 2.

In a status illustrated in FIG. 1, a case in which the eNB 200 needs to know that the UE 100 moves to the coverage of the WLAN AP group B is assumed. In this case, the eNB 200 includes the measurement object identifier (measObjectId) and the measurement object (measObject) corresponding to the WLAN AP group B in the list of the measurement objects to add and modify (MeasObjectToAddModList). The eNB 200 combines the measurement object identifier (measObjectId) corresponding to the WLAN AP group B with a report configuration (ReportConfig) including an event that quality of the WLAN has become higher than a threshold. Therefore, the UE 100 transmits the WLAN measurement report about the WLAN AP 300 to the eNB 200 when quality of the WLAN AP 300 included in the WLAN AP group B becomes higher than a threshold.

As illustrated in FIG. 5, in step S102, the UE 100 performs measurement indicated by the measurement identifier (MeasID) based on the WLAN measurement configuration (MeasConfig). In particular, the UE 100 perform WLAN measurement with respect to the measurement object WLAN (MeasObjectWLAN) corresponding to the measurement identifier (MeasID). Examples of the measurement parameters in the WLAN measurement include "ChannelUtilizationWLAN," "BackhaulRateD1WLAN," "BackhaulRateU1WLAN," and "BeaconRSSI." "ChannelUtilizationWLAN" is included in a WLAN beacon or a probe response, and indicates a WLAN channel utilization rate, that is, a WLAN radio load level. "BackhaulRateD1WLAN" and "BackhaulRateU1WLAN" are provided by an ANQP (Access Network Query Protocol), and indicate an available transmission rate of a WLAN backhaul, that is, a WLAN backhaul load level. "BeaconRSSI" indicates measure WLAN signal intensity by the UE 100. The type of the measurement parameter in the WLAN measurement may be designated by the report configuration (ReportConfig).

In step S103, the UE 100 determines that an event designated by the report configuration (ReportConfig) has occurred based on the WLAN measurement.

In step S104, the UE 100 transmits the WLAN measurement report to the eNB 200. The eNB 200 receives the WLAN measurement report. The WLAN measurement report includes a measurement identifier (MeasID), a WLAN AP identifier (WLAN identifier), a WLAN measurement result, and so forth. The WLAN measurement result may include a result of measuring a signal transmitted from the access point by the WLAN system. Since the measurement identifier (MeasID) is associated with the measurement object identifier (measObjectId), the eNB 200 can identify the WLAN AP group based on the measurement identifier (MeasID). Alternatively, the WLAN measurement report may include the measurement object identifier (measObjectId). Alternatively, in order to reduce signaling overhead, the WLAN measurement report may include an index of the WLAN AP (a WLAN index) instead of the identifier of the WLAN AP (a WLAN identifier).

The eNB 200 knows that the UE 100 has moved to the coverage of the WLAN AP group of the measurement object based on the WLAN measurement report. The eNB 200 determines a WLAN AP 300 to perform WLAN communication with the UE 100 among the WLAN APs 300 included in the WLAN AP group of the measurement object.

In step S105, the eNB 200 transmits a steering command including an identifier of the determined WLAN AP 300 (a WLAN identifier) to the UE 100. An index of the WLAN AP (a WLAN index) may be used instead of the identifier of the WLAN AP (the WLAN identifier). The UE 100 receives the steering command. Such a steering command may be referred to as a "Steering command." In the first embodiment, a case in which the steering command is a command to steer the WLAN communication from one WLAN AP 300 to other WLAN AP 300 is assumed. In particular, the steering command may be a command for steering WLAN communication from a WLAN AP 300 belonging to one WLAN AP group to a WLAN AP 300 belonging to other WLAN AP group. However, the steering command may be a command for steering communication (data) from the eNB 200 to the WLAN AP 300. Alternatively, the steering command may be a command to cause "WLAN Aggregation" to start in which the UE 100 simultaneously performs communication with the eNB 200 and communication with the AP 300. A start command of "WLAN Aggregation" may be transmitted to the UE 100 by an "RRC Connection Reconfiguration" message from the eNB 200.

In step S106, the UE 100 performs steering to WLAN AP 300 designated by the steering command. The UE 100 may transmit an acknowledgement or a negative acknowledgment to respond to the steering command to the eNB 200.

(1.2) Operation Pattern 1B

In an operation pattern 1B of the first embodiment, the eNB 200 transmits notification information different from the WLAN measurement configuration to the UE 100 by broadcast or unicast. The notification information includes each index and each identifier of a plurality of WLAN APs 300. The UE 100 receives the notification information. Alternatively, the UE 100 may receive the notification information from the EPC 500 (a core network) via the eNB 200. For example, the UE 100 receives the notification information from an ANDSF (Access Network Discovery and Selection Function) provided in the EPC 500.

In this manner, a correlation between an index and an identifier of each WLAN AP 300 is notified to the UE 100 separately from the WLAN measurement configuration. Therefore, it is not necessary to include the identifier of the WLAN AP 300 in the WLAN measurement configuration, but the index of the WLAN AP 300 may desirably be included in the WLAN measurement configuration. Therefore, the size of the WLAN measurement configuration (in particular, MeasObjectWLAN) can be reduced. Especially, if the WLAN measurement configuration (in particular, MeasObjectWLAN) is frequently updated, the reduction effect of signaling overhead is large.

FIG. 8 is a sequence diagram illustrating the operation pattern 1B according to the first embodiment. Here, differences from the operation pattern 1A of the first embodiment will be mainly described.

As illustrated in FIG. 8, in step S131, the eNB 200 transmits notification information including each index and each identifier of a plurality of WLAN APs 300 existing in its own coverage to the UE 100 by broadcast or unicast. The UE 100 receives the notification information and stores the received notification information.

If the notification information is transmitted by broadcast, the eNB 200 includes the notification information in, for example, an SIB (System Information Block). If the WLAN AP group is not provided for individual UE but provided in common, that is, if grouping of the WLAN APs is common within the cell with respect to any UE 100, the notification information may desirably be transmitted by SIB for resource reduction. If the notification information is transmitted by unicast, the eNB 200 includes the notification information in an "RRC Connection Reconfiguration" message which is dedicated RRC signaling addressed to the UE 100.

In step S132, the eNB 200 transmits the WLAN measurement configuration to the UE 100. The UE 100 receives the WLAN measurement configuration. In the operation pattern 1B of the first embodiment, the WLAN measurement configuration (in particular, MeasObjectWLAN) includes an index of the WLAN AP 300, but does not include an identifier of the WLAN AP 300. Other points are the same as those of the WLAN measurement configuration in the operation pattern 1A. The UE 100 derives a WLAN identifier corresponding to the index of the WLAN AP 300 included in the WLAN measurement configuration based on the stored notification information.

Subsequent operations (steps S133 to S137) are the same as those of the operation pattern 1A of the first embodiment.

(2) Operation Pattern 2

In an operation pattern 2 of the first embodiment, the predetermined identifier associated with the WLAN AP group of the measurement object is a group identifier of the WLAN AP group of the measurement object.

(2.1) Operation Pattern 2A

In the operation pattern 2A of the first embodiment, the WLAN measurement configuration further includes an identifier of each WLAN AP 300 in the WLAN AP group of the measurement object.

FIG. 9 is a sequence diagram illustrating the operation pattern 2A according to the first embodiment. Here, differences from the operation pattern 1A of the first embodiment will be mainly described.

As illustrated in FIG. 9, in step S151, the eNB 200 transmits the WLAN measurement configuration to the UE 100. The UE 100 receives the WLAN measurement configuration.

In the operation pattern 2A of the embodiment, the measurement object (MeasObject) included in the WLAN measurement configuration (MeasConfig) includes a list of measurement objects to remove (MeasObjectToRemoveList), and a list of a measurement objects to add and modify (MeasObjectToAddModList).

Each measurement object included in the list (MeasObjectToAddModList) of measurement objects to add and modify (MeasObjectToAddMod) includes a measurement object identifier (measObjectId) and a measurement object (measObject). The measurement object (measObject) includes a measurement object WLAN (MeasObjectWLAN). The measurement object WLAN (MeasObjectWLAN) includes a group identifier.

The measurement object WLAN (MeasObjectWLAN) includes a measurement object WLAN frequency (wlancarrierFreq), a list of WLAN APs to remove from the measurement objects (wlansToRemoveList), and a list of WLAN APs to add to the measurement object and modify (wlansToAddModList). The list of WLAN APs to remove from the measurement object (wlansToRemoveList) includes a list of identifiers of the WLAN APs (WLAN identifier). Each WLAN AP information (WlansToAddMod) included in wlansToAddModList includes an identifier of each WLAN AP (wlan-Identifiers-r13).

In step S152, the UE 100 performs measurement indicated by the measurement identifier (MeasID) based on the WLAN measurement configuration (MeasConfig). In particular, the UE 100 performs WLAN measurement with respect to the measurement object WLAN (MeasObjectWLAN) corresponding to the measurement identifier (MeasID).

In step S153, the UE 100 determines that an event designated by a report configuration (ReportConfig) has occurred based on the WLAN measurement.

In step S154, the UE 100 transmits the WLAN measurement report to the eNB 200. The eNB 200 receives the WLAN measurement report. The WLAN measurement report includes a group identifier, a WLAN AP identifier (a WLAN identifier), a WLAN measurement result, and so forth. The eNB 200 can identify the WLAN AP group based on the group identifier. Although the WLAN measurement report includes the WLAN AP identifier (WLAN identifier), the WLAN measurement report does not necessarily have to include a group identifier. This is because the group identifier may be unnecessary if the WLAN AP group can be uniquely specified by the eNB 200 receiving the WLAN identifier. Alternatively, the WLAN measurement report may include a group identifier but does not necessarily have to include a WLAN identifier. This is because if the UE 100 initially connects to the WLAN, the UE 100 does not need even the WLAN identifier.

The eNB 200 knows that the UE 100 has moved to the coverage of the WLAN AP group of the measurement object based on the WLAN measurement report. The eNB 200 determines a WLAN AP 300 to perform WLAN communication with the UE 100 among the WLAN APs 300 included in the WLAN AP group of the measurement object.

In step S155, the eNB 200 transmits a steering command including an identifier of the determined WLAN AP 300 (a WLAN identifier) to the UE 100. The UE 100 receives the steering command. Alternatively, in order to reduce signaling overhead, the steering command may include a group identifier instead of the identifier of the WLAN AP (the WLAN identifier). If a special case in which one WLAN AP belongs to two or more groups is assumed, there is a possibility that the UE 100 freely moves across a plurality of groups connected by the single WLAN AP. In the steering command, an effect of preventing such a motion is expected by explicitly designating a "group" which moves the traffic.

In step S156, the UE 100 performs steering to a WLAN AP 300 designated by the steering command (or a designated WLAN AP group). Alternatively, the steering command may be a command to cause "WLAN Aggregation" to start in which the UE 100 simultaneously performs communication with the eNB 200 and communication with the AP 300. The UE 100 may transmit an acknowledgement or a negative acknowledgment to respond to the steering command to the eNB 200.

(2.2) Operation Pattern 2B

In an operation pattern 2B of the first embodiment, the eNB 200 transmits notification information different from the WLAN measurement configuration to the UE 100 by broadcast or unicast. The notification information includes a group identifier of the WLAN AP group, and an identifier of each WLAN AP 300 in the WLAN AP group. The UE 100 receives the notification information. Alternatively, the UE 100 may receive the notification information from the EPC 500 (a core network) via the eNB 200. For example, the UE 100 receives notification information from ANDSF provided in the EPC 500.

In this manner, a correlation between a group identifier of the WLAN AP group and an identifier of each WLAN AP 300 in that WLAN AP group is notified to the UE 100 separately from the WLAN measurement configuration. Therefore, it is not necessary to include the identifier of the WLAN AP 300 in the WLAN measurement configuration, but the group identifier of the WLAN AP group of the measurement object may desirably be included in the WLAN measurement configuration. Therefore, the size of the WLAN measurement configuration (in particular, MeasObjectWLAN) can be reduced. Especially, if the WLAN measurement configuration (in particular, MeasObjectWLAN) is frequently updated, the reduction effect of signaling overhead is large.

FIG. 10 is a sequence diagram illustrating an operation pattern 2B according to the first embodiment. Here, differences from the operation pattern 2A of the first embodiment will be mainly described.

As illustrated in FIG. 10, in step S171, the eNB 200 transmits notification information including a group identifier of the WLAN AP group existing in its own coverage and an identifier of each WLAN AP 300 in that WLAN AP group to the UE 100 by broadcast or unicast. The UE 100 receives the notification information and stores the received notification information.

If the notification information is transmitted by broadcast, the eNB 200 includes the notification information in, for example, an SIB (System Information Block). If the notification information is transmitted by unicast, the eNB 200 includes the notification information in an "RRC Connection Reconfiguration" message which is dedicated RRC signaling addressed to the UE 100.

In step S172, the eNB 200 transmits the WLAN measurement configuration to the UE 100. The UE 100 receives the WLAN measurement configuration. In the operation pattern 2B of the first embodiment, the WLAN measurement configuration (in particular, MeasObjectWLAN) includes a group identifier of the WLAN AP group of the measurement object, but does not include an identifier of the WLAN AP 300. Other points are the same as those of the WLAN measurement configuration in the operation pattern 2A. The UE 100 derives each WLAN identifier corresponding to the group identifier included in the WLAN measurement configuration based on the stored notification information.

Subsequent operations (steps S173 to S177) are the same as those of the operation pattern 2A of the first embodiment.

(Intra-eNB Handover Control)

Next, intra-eNB handover control will be described.

During intra-eNB handover, various types of configuration information which a source eNB configures in the UE 100 is notified from the source eNB to the target eNB. Such configuration information is referred to as UE context information. The UE context information is transmitted from the source eNB to the target eNB via the X2 interface as a "Handover Preparation Information" message. The "HandoverPreparation Information" message includes RRC configuration information (AS-Config) which the source eNB configures in the UE 100. The RRC configuration information (AS-Config) includes the WLAN measurement configuration (MeasConfig).

As described above, the WLAN measurement configuration (MeasConfig) may include an identifier (and an index) of each WLAN AP 300 included in the WLAN AP group of the measurement object. Therefore, the amount of information of the "Handover Preparation Information" message increases and then the intra-eNB signaling overhead increases.

FIG. 11 is a diagram illustrating the intra-eNB handover control according to the first embodiment. Here, a case in which the UE 100 performs handover from a source eNB 200-1 to a target eNB 200-2 is assumed.

As illustrated in FIG. 11, WLAN AP groups A and B exist in a coverage of the source eNB 200-1. WLAN AP groups B and C exist in a coverage of the target eNB 200-2. Measurement object identifiers (object IDs) #0, #1, and #2 are associated with the WLAN AP groups A, B, and C, respectively.

The WLAN AP group A includes a WLAN AP 300-1 which has an identifier (SSID) #1, and a WLAN AP 300-2 which has an identifier (SSID) #2. The WLAN AP group B includes a WLAN AP 300-3 which has an identifier (SSID) #3, and a WLAN AP 300-4 which has an identifier (SSID) #4. The WLAN AP group C includes a WLAN AP 300-5 which has an identifier (SSID) #5, and a WLAN AP 300-6 which has an identifier (SSID) #6.

In such an environment, OAM (Operation Administration Maintenance) 600 which manages the source eNB 200-1 and the target eNB 200-2 collectively manages the WLAN AP group, the measurement object identifier (object ID) thereof, and the identifier (SSID) of each WLAN AP 300 included in that WLAN AP group, and shares managed information with each eNB 200. That is, each eNB 200 (the source eNB 200-1 and the target eNB 200-2) obtains in advance the WLAN AP group existing in its own coverage, its measurement object identifier, and the identifier of each WLAN AP 300 included in the WLAN AP group from the OAM 600.

Each eNB 200 stores the WLAN group information on the WLAN access point group existing in the coverage of its own eNB 200. The WLAN group information includes predetermined identifier which indicates the WLAN access point group, and the identifier of each WLAN access point in the WLAN access point group. The predetermined identifier is the group identifier of the WLAN access point group. Alternatively, the predetermined identifier is the identifier (object ID) of the measurement object configuration for configuring the measurement object in the UE 100.

(1) Operation Pattern 1

Figure 12:
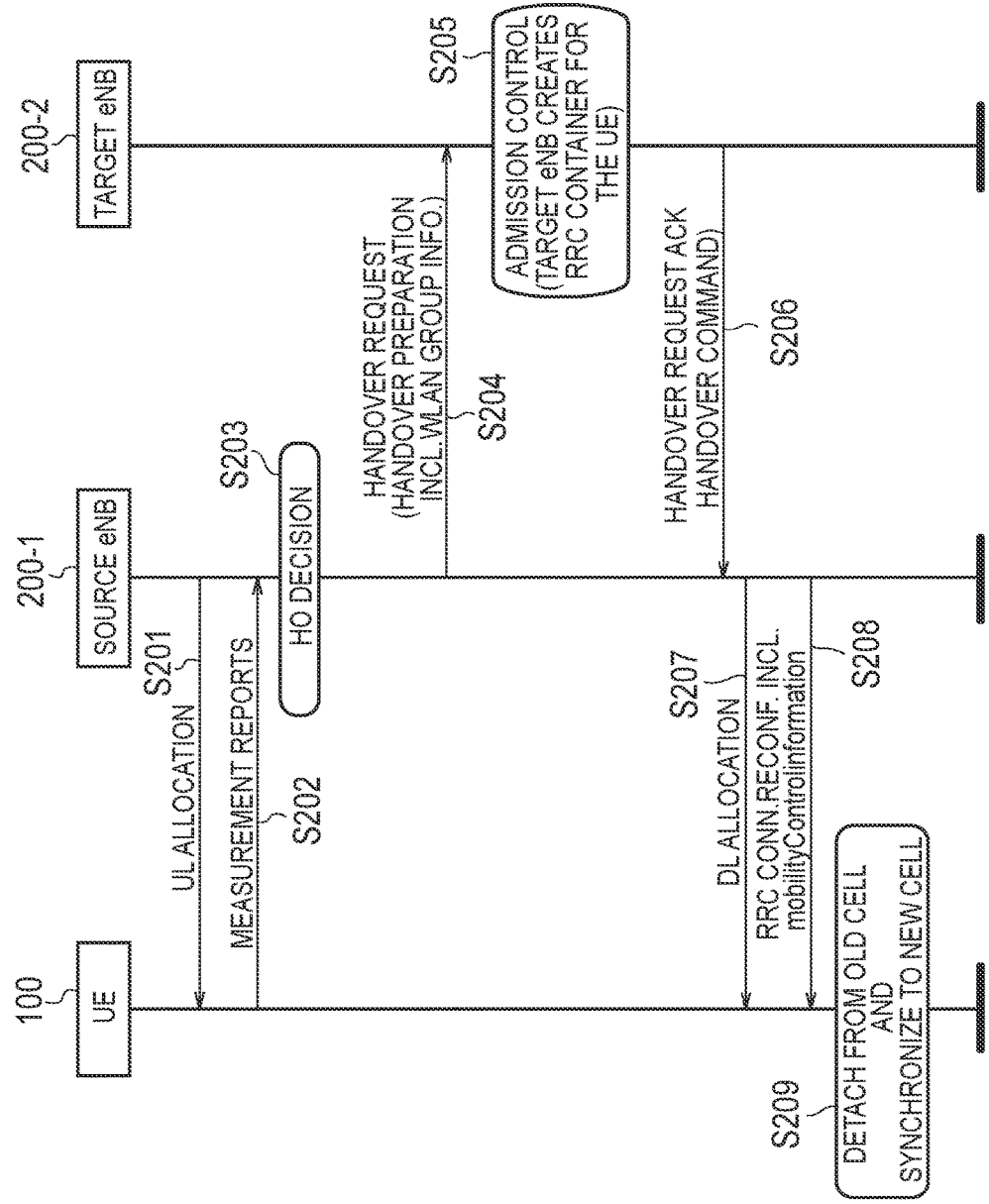
FIG. 12 is a sequence diagram illustrating an operation pattern 1 of the intra-eNB handover control according to the first embodiment.

FIG. 12 is a sequence diagram illustrating an operation pattern 1 of intra-eNB handover control according to the first embodiment. Before this sequence, the source eNB 200-1 configures a usual measurement configuration for handover in the UE 100. Further, the source eNB 200-1 configures the predetermined identifier indicating the WLAN access point group of the measurement object (the measurement object identifier and/or the group identifier) in the UE 100 as a part of the WLAN measurement configuration. If the status illustrated in FIG. 11 is assumed, the source eNB 200-1 has configured the predetermined identifier indicating the group A and the predetermined identifier indicating the group B in the UE 100.

As illustrated in FIG. 12, in step S201, the source eNB 200-1 allocates an uplink radio resource to the UE 100 (UL allocation).

In step S202, the UE 100 transmits the measurement report (MeasurementReport) about the cell of the target eNB 200-2 to the source eNB 200-1 by using allocated uplink radio resource.

In step S203, the source eNB 200-1 determines handover of the UE 100 to the cell of the target eNB 200-2 based on the measurement report (Measurement Report) about the cell of the target eNB 200-2.

In step S204, the source eNB 200-1 notifies handover preparation information (Handover Preparation Information) to the target eNB 200-2. In particular, the source eNB 200-1 includes the handover preparation information in a handover request (Handover Request) to be transmitted on the X2 interface. The handover preparation information includes a predetermined identifier (the measurement object identifier and/or the group identifier) configured in the UE 100. Here, the handover preparation information includes the predetermined identifier (the measurement object identifier and/or the group identifier) configured in the UE 100, but does not include the identifier of the WLAN AP 300 (the WLAN identifier).

If the status illustrated in FIG. 11 is assumed, the source eNB 200-1 includes the predetermined identifier indicating the group A and the predetermined identifier indicating the group B in the UE 100. However, the source eNB 200-1 does not include the WLAN identifier (SSID #1, #2) of the group A and the WLAN identifier (SSID #3, #4) of the group B in the handover preparation information.

The target eNB 200-2 receives the handover request including the handover preparation information from the source eNB 200-1.

In step S205, the target eNB 200-2 determines whether to acknowledge the handover of the UE 100 based on the handover request from the source eNB 200-1. Here, description will be proceeded assuming that the handover of the UE 100 has been acknowledged. The target eNB 200-2 determines whether the WLAN measurement configuration configured in the UE 100 is to be changed based on the handover preparation information. In particular, the target eNB 200-2 determines to change the WLAN measurement configuration configured in the UE 100 such that the WLAN AP group existing in the coverage of the target cell is set to a measurement object. If the status illustrated in FIG. 11 is assumed, the target eNB 200-2 will be determined to remove the group A from the measurement object, maintain the group B as the measurement object, and add the group C as the measurement object. The target eNB 200-2 then generates RRC configuration information (RRC Container) including the WLAN measurement configuration configured in the UE 100.

In step S206, the target eNB 200-2 transmits a handover command (Handover command) including information (RRC Container) for changing the WLAN measurement configuration configured in the UE 100 to the source eNB 200-1. In particular, the target eNB 200-2 includes the handover command in a handover request acknowledgement (Handover Request Ack) to be transmitted on the X2 interface. The handover command is notified to the UE 100 from the target eNB 200-2 via the source eNB 200-1.

In step S207, the source eNB 200-1 allocates a downlink radio resource to the UE 100 (DL allocation).

In step S208, the source eNB 200-1 transmits mobility control information (mobilityControlInfomation) including a handover command of the target eNB 200-2 to the UE 100 by using the allocated downlink radio resource. In particular, the source eNB 200-1 includes the mobility control information in the "RRC Connection Reconfiguration" message.

The UE 100 receives the "RRC Connection Reconfiguration" message. The UE 100 updates the WLAN measurement configuration in accordance with the information on the handover command included in the mobility control information (RRC Container). Therefore, the WLAN measurement configuration determined by the target eNB 200-2 is configured in the UE 100.

In step S209, the UE 100 detaches from the cell of the source eNB 200-1 and synchronizes with the cell of the target eNB 200-2, whereby handover is performed. After the handover, the UE 100 performs WLAN measurement in accordance with the WLAN measurement configuration determined by the target eNB 200-2.

(2) Operation Pattern 2

In the operation pattern 1 of the intra-eNB handover control, a case in which the WLAN measurement configuration (WLAN group information) is UE-specific has been assumed. If the WLAN measurement configuration is cell-specific (eNB-specific), the source eNB 200-1 and the target eNB 200-2 do not necessarily have to notify the WLAN measurement configuration for every UE 100. That is, since the same WLAN measurement configuration is applied to all the UE 100 connected to the target eNB 200-2 (target cell), the source eNB 200-1 may acquire the WLAN measurement configuration of the target eNB 200-2 in advance.

Figure 13:
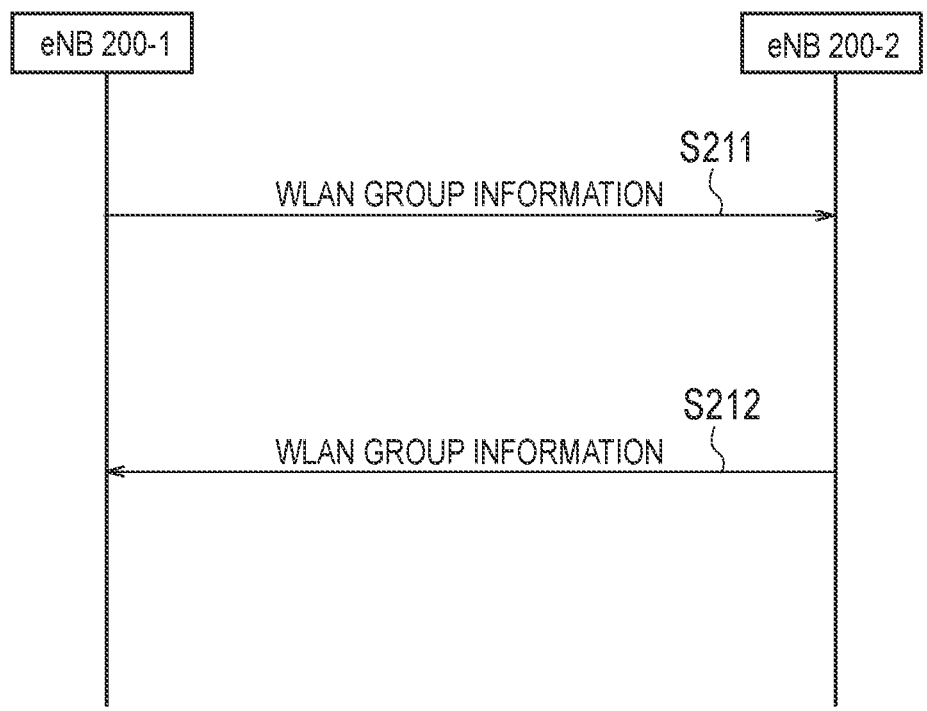
FIG. 13 is a sequence diagram illustrating an operation pattern 2 of the intra-eNB handover control according to the first embodiment.

FIG. 13 is a sequence diagram illustrating the operation pattern 2 of intra-eNB handover control according to the first embodiment.

As illustrated in FIG. 13, in step S211, the eNB 200-1 transmits the WLAN group information on the WLAN access point group existing in the coverage of its own eNB 200 to the eNB 200-2. The eNB 200-2 receives the WLAN group information and stores the received WLAN group information.

In step S212, the eNB 200-2 transmits the WLAN group information on the WLAN access point group existing in the coverage of its own eNB 200 to the eNB 200-1. The eNB 200-1 receives the WLAN group information and stores the received WLAN group information.

For example, each of the eNB 200-1 and the eNB 200-2 includes the WLAN group information in the "eNB Configuration Update" message which is to be transmitted on the X2 interface.

If handover of the UE 100 is to be performed from the eNB 200-1 to the eNB 200-2, since the eNB 200-2 knows the WLAN group information of the eNB 200-1, the eNB 200-2 can generate appropriate RRC configuration information (RRC Container) in response to a handover request from the eNB 200-1. Then the eNB 200-2 notifies the handover command (Handover Command) including the RRC configuration information (RRC Container) to the UE 100 via the eNB 200-1.

Second Embodiment

Hereinafter, a second embodiment will be described with reference to differences from the first embodiment mainly.

In the first embodiment, subsequent operations of the UE 100 after the WLAN is selected in response to the steering command (Steering command) from the eNB 200 have not been described.

In the second embodiment, a case in which UE 100 which has selected the WLAN in response to a steering command from the eNB 200 (step S105 of FIG. 5, step S136 of FIG. 8, step S155 of FIG. 9, step S176 of FIG. 10) transitions from an RRC connected mode to an RRC idle mode is assumed.

In the RRC connected mode, the UE 100 according to the second embodiment receives a WLAN measurement configuration for configuring a WLAN measurement report from the eNB 200. If the UE 100 transitions from the RRC connected mode to the RRC idle mode, the UE 100 holds the WLAN measurement configuration in the RRC idle mode. In particular, if the UE 100 steers to the WLAN AP 300 in response to a steering command from the eNB 200, the UE 100 transitions from the RRC connected mode to the RRC idle mode and the WLAN measurement configuration is held in the RRC idle mode.

Therefore, the UE 100 can continue WLAN measurement in the RRC idle mode. For example, the UE 100 which has transitioned to the RRC idle mode after moving data to the WLAN AP of the WLAN AP group A in response to the steering command, the UE 100 can return to the RRC connected mode again and report to the eNB 200 when discovering a WLAN AP of the WLAN AP group B.

In the second embodiment, the WLAN measurement configuration may be included in the steering command. In this case, a WLAN measurement configuration for the RRC idle mode may be defined.

In the second embodiment, the UE 100 may hold the WLAN measurement configuration in the RRC idle mode as long as the UE 100 is receiving, from the eNB 200, the configuration information indicating that the WLAN measurement configuration is to be held. The eNB 200 may transmit the configuration information indicating that the WLAN measurement configuration is to be held to the UE 100 together with the WLAN measurement configuration, or transmit the configuration information to the UE 100 separately from the WLAN measurement configuration. The eNB 200 may transmit the configuration information indicating that the WLAN measurement configuration is to be held by broadcast or transmit the configuration information by unicast. If no configuration information indicating that the WLAN measurement configuration is to be held is received from the eNB 200, the UE 100 may discard the WLAN measurement configuration when the UE 100 transitions to the RRC idle mode.

Alternatively, the UE 100 may receive period information (a timer value) indicating a period during which the WLAN measurement configuration to be held from the eNB 200. The eNB 200 may transmit the period information to the UE 100 together with the WLAN measurement configuration, or transmit the period information to the UE 100 separately from the WLAN measurement configuration. The eNB 200 may transmit the period information by broadcast, or transmit the period information by unicast. The UE 100 holds the WLAN measurement configuration over the period indicated by the period information after the UE 100 transitions from the RRC connected mode to the RRC idle mode. In particular, when the UE 100 transitions to the RRC idle mode, the UE 100 starts a timer corresponding to the period information, and holds the WLAN measurement configuration until the timer expires. When the timer expires, the UE 100 may discard the WLAN measurement configuration.

In the second embodiment, the UE 100 performs measurement with respect to a WLAN AP group of a measurement object in the RRC idle mode based on the held WLAN measurement configuration. Then, in the RRC idle mode, the UE 100 may transition (return) from the RRC idle mode to the RRC connected mode based on the discover of the WLAN AP group of the measurement object or the measurement result. The "discover" of the WLAN AP group of the measurement object may be discover of an access point included in the WLAN AP group. The "measurement result" of the WLAN AP group of the measurement object may be a measurement result about a signal transmitted from the access point included in the WLAN AP group.

In particular, the UE 100 transitions from the RRC idle mode to the RRC connected mode at timing at which an event designated by the WLAN measurement configuration occurs. In this case, the UE 100 transmits the WLAN measurement report to the eNB 200 in the RRC connected mode.

Alternatively, the UE 100 transitions from the RRC idle mode to the RRC connected mode at timing at which a measurement object in an unreported WLAN AP group is discovered. In this case, the UE 100 performs the WLAN measurement in the RRC connected mode. Examples of effects of measurement after returning to the RRC connected mode may include prompt transmission of the WLAN measurement report to the eNB 200 when an event designated by the WLAN measurement configuration occurs, and the like.

In the second embodiment, the UE 100 may transition from the RRC idle mode to the RRC connected mode based on the discover of the WLAN AP group of the measurement object or the measurement result as long as the UE 100 is receiving, from the eNB 200, the configuration information indicating that the UE 100 need to transition to the RRC connected mode. That is, the eNB 200 may designate whether the UE 100 need to return to the RRC connected mode. The eNB 200 may transmit the configuration information indicating that the WLAN measurement configuration is to be held to the UE 100 together with the WLAN measurement configuration, or transmit the configuration information to the UE 100 separately from the WLAN measurement configuration. The eNB 200 may transmit the configuration information indicating that the WLAN measurement configuration is to be held by broadcast or transmit the configuration information by unicast.

If the UE 100 does not receive configuration information indicating that the UE 100 need to transition to the RRC connected mode from the eNB 200, the UE 100 does not necessarily have to transition from the RRC idle mode to the RRC connected mode based on the discover of the WLAN AP group of the measurement object or the measurement result. In this case, the UE 100 may continue the WLAN measurement in the RRC idle mode, and may perform steering control on the initiative of the UE.

Other Embodiment

In the first embodiment, an example in which a trigger event is designated by a report configuration (ReportConfig) has been described. However, the trigger event may be configured in advance by the UE 100. For example, the UE 100 may transmit the measurement report to the eNB 200 when the UE 100 discovers a WLAN AP 300 of the measurement object in an unreported group irrespective of signal intensity or the like.

Regarding the WLAN APs 300 in the same group, the UE 100 desirably does not notify even if these WLAN APs 300 satisfy the event. That is, when the UE 100 moves from one WLAN AP to other WLAN AP within the same group, the UE 100 does not trigger the WLAN measurement report.

Therefore, the UE 100 knows that the UE 100 enters the WLAN AP group, and that leaves the WLAN AP group. For example, if the UE 100 detects a first WLAN AP 300 of which quality of the WLAN is higher than a threshold in a certain WLAN AP group, the UE 100 determines that the UE 100 has entered that WLAN AP group. If the current quality of the WLAN has become lower than the threshold in a certain WLAN AP group, and if no WLAN AP 300 of which quality of the WLAN has become higher than the threshold in the WLAN AP group exists, the UE 100 determines that the UE 100 has left the WLAN AP group.

In the first embodiment, an intra-eNB handover procedure on the X2 interface has been described. However, instead of the intra-eNB handover procedure on the X2 interface, an intra-eNB handover procedure on the S1 interface may be employed. In the case of the intra-eNB handover procedure on the S1 interface, the MME exists in the signaling between the source eNB and the target eNB.

In each embodiment described above, the LTE system is illustrated as the WWAN system. However, the present disclosure is not limited to the LTE system. The present disclosure may be applied also to the WWAN system other than the LTE system.

APPENDIX (1. Introduction)
There are the statements "The eNB provides the UE with a group of APs (e.g. by SSID, HESSID or BSSID)" and "it is FFS how the IDs are provided to the UEs in case of aggregation and in case of interworking (i.e. the provisioning may be different)" in the documents that comprise current agreements. With consideration on how these agreements should be captured in specification, this appendix discusses enhancement of following measurement framework particularly for interworking enhancement:
  Measurement object
  Reporting configuration
  Quantity configuration
  Measurement identity
  Measurement gap
(2. Discussion)
(2.1. Measurement Object)
There is an agreement that "The eNB may configure measurement objects for WLAN measurements". As current inter-RAT measurement object MeasObjectCDMA2000 and MeasObjectUTRA contain cells to Remove/AddMod list, simple enhancement for WLAN is to define wlansToRemoveList and wlansToAddModList included in MeasObjectWLAN for addition/removal if WLAN identifiers.

The wlansToAddModList may contain WLAN-Identifiers and corresponding index (i.e. wlanIndex). The wlanIndex is essential when eNB removes specific WLAN identifier. eNB can indicate specific index instead of WLAN identifier so that it reduces message size.

Proposal 1: RAN2 is kindly asked to introduce measObjectWLAN which contains wlansToRemoveList and wlansToAddModList.

Proposal 2: The wlansToAddModList contains wlanIndex. And the wlansToRemoveList is equal to wlanIndexList.

In the following sub-clause, further consideration on the enhancement of measurement object is discussed for both WLAN aggregation case and interworking enhancement case separately.

(2.1.1. Measurement Object Enhancement for WLAN Aggregation)
According to the existing RRM measurement, measurement objects include the list of cells. For example, MeasObjectUTRA contains physCellId within the cellsToAddModList. From this point of view, it is natural to reuse this for providing WLAN identifiers.

Since WLAN aggregation is based on Rel-12 Dual Connectivity, only the UE in RRC CONNTECTED mode need to be considered. Therefore, it isn't essential for the eNB to broadcast WLAN identifiers as in Rel-12 interworking. Even if the eNB broadcasts WLAN identifiers for interworking operation, WLAN aggregation capable AP may be different from APs for interworking.

Proposal 3: For WLAN aggregation, eNB configures measObjectWLAN which contains WLAN identifiers. RAN2 should not mandate eNB broadcasts WLAN identifiers.

(2.1.2. Measurement Object Enhancement for Interworking Enhancement)
According to TR, the UE in idle mode which applies solution 3 performs access network selection with broadcasted RAN assistance parameters. However it is not crystal clear whether RAN2 assumes Rel-13 interworking enhancement supports UE in IDEL mode or not. It should be clarified for promoting the discussion. Rel-12 interworking already supports IDLE UE traffic steering so there's no reason not to support the same UE behavior for Rel-13 for consistency.

Proposal 4: RAN2 is kindly asked whether Rel-13 interworking for IDLE UEs is supported.

If Rel-13 interworking is supported for IDLE UEs is supported, then it would be expected that SIB17 or an enhanced version of SIB17 be broadcasted to support IDLE UEs.

Proposal 5: Enhanced version of SIB17 should be broadcasted by the serving cell to support IDLE UEs for Rel-13 WLAN interworking.

If eNB broadcasts RAN assistance parameters for UE in idle mode, broadcasting WLAN identifiers and to configure measObjectWLAN which contains WLAN identifiers seems duplication. As in other proposal, the option that measObjectWLAN just indicates the reference to the broadcasted WLAN identifiers can reduce signalling overhead.

However there is an unclear point with this option. That is whether the Rel-12 WLAN identifier can be reused or Rel-13 WLAN identifiers are additionally needed. Unlike UE-based solution specified in Rel-12, interworking enhancement requires finer granularity of the WLAN identifiers. In particular for the case there is Xw interface between WT and eNB, the eNB needs to identify which WT manages the reported WLAN identifier. This is a difference between Rel-12 and Rel-13 WLAN identifiers. Furthermore, it may be difficult for UE to associate wlanIndex-r13 configured in measurement object with existing broadcasted WLAN identifiers without explicit reference value. It is better to clarify whether RAN2 needs to specify additional WLAN-identifiers-r13 which includes explicit reference or not.

Proposal 6: RAN2 should discuss whether additional WLAN-Identifiers-r13 which may contain explicit or implicit reference value for association with measurement object ID is introduced.

There are two alternatives as the explicit reference value which is broadcasted.
  Alt.1 eNB broadcast wlanIndex with each WLAN identifier
  Alt.2 eNB broadcast wlan-Group-ID with each WLAN identifier Alt.1 is similar concept to the one introduced in subclause 2.1.1. It is tied with each WLAN identifier.

Alt.2 is additional information which group the WLAN identifier belongs to. Since several WLAN identifiers belong to the same group, size of maximum number of the groups are assumed smaller than maximum number of WLAN identifiers.

For Alt.2, if groups of APs are not close by, it is possible to reuse the same group SSIDs for different groups to reduce the number of SSIDs broadcasted.

(2.2. Reporting Configuration)

For both aggregation and interworking, it agreed following two types of UE behaviours:

UE may perform mobility (within a group of APs) transparent to the eNB.

UE mobility across groups of APs is controlled by the eNB e.g. based on measurement reports provided by the UE.

This may be rephrased as an agreement for the eNB to configure a UE to initiate a measurement report when it satisfies entering condition to another group of APs while the UE does not have to initiate the report within the same group.

The grouping is simply achievable if APs within the same group (e.g. the APs under the same Extended Service Set) are associated with one entry in the wlansToAddModList. In other words, the group of APs is consistent with how measurement object ID is used.

The UE behaviour, which is it initiates a measurement reporting when it entering another group of APs, while the UE does not have to initiate reporting within the same group, is achieved with two rules:

1) The UE initiates measurement reporting if the entering condition for a specified WLAN Event is fulfilled for a target AP belonging to a different AP group.

2) The UE initiates measurement reporting if the leaving condition for a specified WLAN Event is fulfilled for any AP belonging to the same AP group.

This general principle can be applied for event W1 to W4 which are introduced in the TR.

Proposal 7: The group of APs is consistent with one MeasObjectWLAN.

Proposal 8: The UE initiates measurement reporting if the entering condition for a specified WLAN Event is fulfilled for a target AP belonging to a different AP group.

Proposal 9: The UE initiates measurement reporting if the leaving condition for a specified WLAN Event is fulfilled for any AP belonging to the same AP group.

In the measurement report, it may be possible that eNB indicate the triggered WLAN identifier with the explicit reference which introduced in section 2.2. With this option, the message size of the report can be reduced.

(2.3. Quantity Configuration)

As existing quantity configuration specifies the measurement quantities and layer 3 filtering coefficients for inter-RAT measurements, it should be enhanced for WLAN measurement. At least it includes filter coefficient for WLAN RSSI measurement.

Proposal 10: RAN2 should specify the QuantityConfigWLAN, which contains the measQuantityWLAN set at least with RSSI, and the filterCoefficient.

RAN2 can consider reusing RAN assistance parameters other than RSSI (e.g. BSS load).

(2.4. Measurement Identity and Measurement Gap)

Measurement identity links one measurement object with one reporting configuration. Changes are not needed for WLAN measurement and the existing rule may be applicable for WLAN.

The measurement gap is not need to be enhanced since the RF chains in a UE may be typically different between LTE and WLAN, except for LAA case.

Even if there is interference problem, it may be resolved by reusing the existing IDC solution.

Proposal 11: No enhancement for measurement identity or measurement gap is needed.

The entire contents of U.S. provisional application No. 62/198,953 (filed Jul. 30, 2015) is hereby incorporated by reference.

INDUSTRIAL APPLICABILITY

The present invention is useful in the mobile communication field.

The invention claimed is:

1. A radio terminal configured to perform communication with a base station and a wireless wide area network (WWAN) system, comprising:
a controller configured to receive first configuration information with which the radio terminal configures a measurement report from the base station in an RRC (Radio Resource Control) connected mode,
the measurement report is a report of a measurement result on a signal transmitted by a wireless local area network (WLAN) system from an access point, wherein
the controller configured to configure a measurement of a signal transmitted by a WLAN system from an access point based on the first configuration information, and
if the controller transitions from the RRC connected mode to an RRC idle mode, the controller holds the first configuration information in the RRC idle mode, wherein
the controller is configured to
if control for performing communication with the access point is started in response to a steering command from the base station,
transition from the RRC connected mode to the RRC idle mode, and
hold the first configuration information in the RRC idle mode.

2. The radio terminal according to claim 1, wherein the first configuration information is included in the steering command.

3. The radio terminal according to claim 1, wherein the controller is configured to hold the first configuration information in the RRC idle mode as long as the controller is receiving, from the base station, second configuration information indicating that the first configuration information is to be held.

4. The radio terminal according to claim 1, wherein the controller is configured to receive, from the base station, period information indicating a period in which the controller needs to hold the first configuration information, and
the controller is configured to hold the first configuration information over the period indicated by the period information after the controller transitions from the RRC connected mode to the RRC idle mode.

5. A radio terminal configured to perform communication with a base station and a wireless wide area network (WWAN) system, comprising:
- a controller configured to receive first configuration information with which the radio terminal configures a measurement report from the base station in an RRC (Radio Resource Control) connected mode,
- the measurement report is a report of a measurement result on a signal transmitted by a wireless local area network (WLAN) system from an access point, wherein
- the controller configured to configure a measurement of a signal transmitted by a WLAN system from an access point based on the first configuration information, and
- if the controller transitions from the RRC connected mode to an RRC idle mode, the controller holds the first configuration information in the RRC idle mode, wherein
- the first configuration information includes a predetermined identifier associated with a group of access points of measurement objects,
- the controller is configured to perform measurement on the access points included in the group of access points of the measurement objects in the RRC idle mode based on the first configuration information, and
- in the RRC idle mode, the controller is configured to transition from the RRC idle mode to the RRC connected mode based on a discover or a measurement result of the access points included in the group, wherein
- the controller is configured to transition from the RRC idle mode to the RRC connected mode based on the discover or the measurement result of the access points included in the group as long as the controller is receiving, from the base station, third configuration information indicating that the controller need to transition to the RRC connected mode.

6. An apparatus used in a radio terminal configured to perform communication with a base station and a wireless wide area network (WWAN) system, the apparatus comprising:
- a processor and a memory coupled to the processor, the processor configured to perform processes of:
  - receiving first configuration information with which the radio terminal configures a measurement report, from the base station, in an RRC (Radio Resource Control) connected mode, the measurement report being a report of a measurement result on a signal transmitted by a wireless local area network (WLAN) system from an access point;
  - configuring a measurement of a signal transmitted by a WLAN system from an access point based on the first configuration information;
  - holding the first configuration information in an RRC idle mode, when transitioning from the RRC connected mode to the RRC idle mode; and
  - when control for performing communication with the access point is started in response to a steering command from the base station,
    - transitioning from the RRC connected mode to the RRC idle mode, and
    - holding the first configuration information in the RRC idle mode.

7. A communication method used in a radio terminal configured to perform communication with a base station and a wireless wide area network (WWAN) system, the communication method comprising:
- receiving first configuration information with which the radio terminal configures a measurement report, from the base station, in an RRC (Radio Resource Control) connected mode, the measurement report being a report of a measurement result on a signal transmitted by a wireless local area network (WLAN) system from an access point;
- configuring a measurement of a signal transmitted by a WLAN system from an access point based on the first configuration information;
- holding the first configuration information in an RRC idle mode, when transitioning from the RRC connected mode to the RRC idle mode; and
- when control for performing communication with the access point is started in response to a steering command from the base station,
  - transitioning from the RRC connected mode to the RRC idle mode, and
  - holding the first configuration information in the RRC idle mode.

* * * * *